United States Patent
Lang et al.

(10) Patent No.: US 8,453,246 B2
(45) Date of Patent: May 28, 2013

(54) CONTROL FRAMEWORK GENERATION FOR IMPROVING A SECURITY RISK OF AN ENVIRONMENT

(75) Inventors: Robert A. Lang, Charlotte, NC (US); Chad Renfro, Dallas, TX (US); Sean Catlett, Dallas, TX (US); Matt Hinman, Smyrna, GA (US); Chris Higgins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 958 days.

(21) Appl. No.: 11/961,411

(22) Filed: Dec. 20, 2007

(65) Prior Publication Data

US 2009/0260086 A1    Oct. 15, 2009

(51) Int. Cl.
  *G06F 11/00* (2006.01)
  *G06F 12/14* (2006.01)
  *G06F 12/16* (2006.01)
  *G08B 23/00* (2006.01)

(52) U.S. Cl.
  USPC .................................................. 726/25

(58) Field of Classification Search
  None
  See application file for complete search history.

(56) References Cited

U.S. PATENT DOCUMENTS

| | | | |
|---|---|---|---|
| 7,552,480 B1* | 6/2009 | Voss | 726/25 |
| 2005/0076243 A1* | 4/2005 | Morohashi et al. | 713/201 |
| 2006/0191012 A1 | 8/2006 | Banzhof | |
| 2006/0265751 A1 | 11/2006 | Cosquer | |
| 2007/0016955 A1* | 1/2007 | Goldberg et al. | 726/25 |

OTHER PUBLICATIONS

International Search Report and Written Opinion mailed Jul. 9, 2010 for International Application No. PCT/US 08/88035.

* cited by examiner

*Primary Examiner* — Philip Chea
*Assistant Examiner* — Trong Nguyen
(74) *Attorney, Agent, or Firm* — Michael A. Springs; Moore & Van Allen PLLC; James C. Edwards (57) ABSTRACT

Apparatus and method for managing risk in an environment where information is received regarding a problem in an environment. A security risk is analyzed associated with the problem. Controls associated with the environment containing the problem are analyzed. A framework is generated defining one or more controls for mitigating the security risk responsive to the analyzed security risk and controls.

19 Claims, 8 Drawing Sheets

| RATING | THREATS | VULNERABILITIES | ASSET VALUE PER VOLUME |
|---|---|---|---|
| 9 | HIGH LIKELIHOOD, HIGH MAGNITUDE | EASY TO EXPLOIT WITH A HIGH MAGNITUDE | LARGE AMOUNT OF DATA PER UNIT |
| 3 | MEDIUM LIKELIHOOD, MEDIUM MAGNITUDE | AVERAGE TO EXPLOIT WITH A MEDIUM MAGNITUDE | MEDIUM AMOUNT OF DATA PER UNIT |
| 1 | LOW LIKELIHOOD, LOW MAGNITUDE | DIFFICULT TO EXPLOIT WITH A LOW MAGNITUDE | LOW AMOUNT OF DATA PER UNIT |

| SURFACES | THREATS | VULNERABILITIES | ASSET VALUE PER VOLUME | SCORE | MITIGATING CONTROLS | RESIDUAL RISK |
|---|---|---|---|---|---|---|
| ENVIRONMENT A | 9 | 9 | 9 | 729 | 1 | 729 |
| ENVIRONMENT B | 9 | 9 | 1 | 81 | 1 | 81 |
| ENVIRONMENT C | 9 | 3 | 9 | 243 | 1 | 243 |
| ENVIRONMENT D | 3 | 3 | 9 | 81 | 3 | 27 |

FIG. 4

| Unstructured Data Environment | | Environment A | Environment B | Environment C | Environment D | Solutions | Surface Area Impact |
|---|---|---|---|---|---|---|---|
| Residual Risk Rating *(This ranking comes from the Risk Quantification Formula)* | | High | Medium | High | Medium | | Total |
| Controls/Capabilities | Control Type & Plan | | | | | | |
| Control A | Managerial Control | S – | 1 Y | 1 Y | S – | Point Solution | 2 |
| Control B | Detective Control | 3 R | S – | 3 R | S – | Enterprise Solution | 2 |
| Control C | Preventative Control | 3 G | 3 R | 3 G | 3 R | Point Solution | 4 |
| Control D | Preventative & Detective Control | S – | 9 G | 9 G | 9 G | Deployed Enterprise Solution & Requirement | 3 |
| Controls in place today | | 2 | 3 | 4 | 2 | | |

*These controls will help establish the Mitigating Controls in the Risk Quantification Formula*

| Controls Scoring Legend | Scoring | Definition | Timeframe |
|---|---|---|---|
| Preventative & Detective Control (PD) | 9 | Ability to deter event and detect it occurred | Control can to be tested and implemented beyond 12 months |
| Preventative Control (P) | 3 | Deter undesirable events from occurring | Control can to be tested and implemented beyond 12 months |
| Detective Control (D) | 3 | Detect & correct undesirable events which have occurred | Control can be in place within 12 months |
| Managerial Control (M) | 1 | Policy, Vulnerability Management Assessment Recommendations, Associate Awareness | Control can be in place within 3 months |
| Not Applicable | - | The control does not fit the environment | - |

502

| Color Coding | Control |
|---|---|
| G = green | Preventative and/or Detective Control in place |
| Y = yellow | Managerial Control in place |
| R = red | No Control in place |
| S = silver | Not Applicable |

503

| Solution | Environment |
|---|---|
| Deployed Enterprise Solution & Requirement | Control is deployed throughout the entire enterprise and this solution is a required standard |
| Enterprise Solution | Control will need to be placed throughout the entire enterprise |
| Point Solution | Control can be used within the Line of Business |

CONTROL FRAMEWORK GENERATION FOR IMPROVING A SECURITY RISK OF AN ENVIRONMENT

BACKGROUND OF THE INVENTION

The present invention is related to security risk environments, and more specifically to control framework generation for improving a security risk of an environment.

Currently, with security becoming a major issue in all aspects of life, data security within companies and other enterprises is also becoming more and more important. Some environments may contain data that exist in a secure environment, but then the environment may allow for the data to become non-secure by data movement or reproduction by an individual. Companies and other entities are searching for better ways to protect their employees, customers, and shareholders information, and other information that may exist in an un-secure environment. Further, there is potential risk to a company when confidential information is moved to an un-secure environment where appropriate controls are not in place to safeguard the information in the event of loss or theft. Companies have a strong interest in preventing confidential information from leaking outside of the company without knowing where the leak came from. Access to confidential information by an unauthorized person or party may trigger a privacy event which may negatively impact the company in many different ways, e.g., regulatory compliance, identity theft, etc.

BRIEF SUMMARY OF THE INVENTION

According to one aspect of the present invention, a method for managing risk in an environment includes receiving information regarding a problem in an environment, analyzing a security risk associated with the problem, analyzing controls associated with the environment containing the problem, and generating a framework defining at least one control for mitigating the security risk responsive to the analyzed security risk and controls.

According to another aspect of the present invention, a control accelerator that includes a first analyzer, a second analyzer and a processor. The first analyzer analyzes one or more controls in an environment. The second analyzer analyzes a security risk associated with a problem in the environment. The processor generates a framework defining one or more mitigating controls for mitigating the security risk responsive to the analyzed one or more controls and the analyzed security risk.

According to a further aspect of the present invention, an apparatus includes a storage medium with instructions stored therein, the instructions when executed causing a processing device to perform receiving information regarding a problem in an environment, analyzing a security risk associated with the problem, analyzing controls associated with the environment containing the problem, and generating a framework defining at least one control for mitigating the security risk responsive to the analyzed security risk and controls.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to control framework generation for improving a security risk of an environment where current control frameworks such as, for example, Control Objectives for Information and related Technologies (CobIT), Committee of Sponsoring Organizations of the Treadway Commission (COSO), ISO17799 and others, may be mapped to an hierarchical and temporal model that may be used to assess and size an environment for a given risk. Upon identifying controls that may be used in the environment to help mitigate the risk, the model may link to proposed processes to establish a given framework. Quantitative mathematical models may be used to assess and score the risk and the controls in the environment.

A control framework according to embodiments of the present invention may encompass a control maturity model (CMM) that may define the control environment in measure and overall strategy. Factors such as existing control performance and external factors may drive deficiency in control in an environment. External factors may be categorized as, for example, business drivers, audit issues, threat environment, etc. According to embodiments of the present invention, a control accelerator (or control playbook) may be used when existing control performance or external factors identify a weakness in control in the environment. The control accelerator may provide a framework to improve and measure improvement and the control environment. The control accelerator may drive process and control improvements that may become part of a corporate or enterprise process. These processes may be mapped and control points measured and recorded. The risk, environment and controls may be monitored and any deficiency in the current controls may again drive generating an updated CMM and require use of the control accelerator.

Embodiments according to the present invention may include a process that encompasses process portions such as, for example, observation, control accelerator, process mapping, risk-based dashboards, and evaluate immunity. An observation process may include the examination of both leading and lagging indicators to identify a current or potential information security risk that could impact a business. These may include, but are not limited to, observed and reported threats (both physical and cyber), business drivers, reported audit issues (i.e., identified control gaps), and risk-based dashboards (measuring control effectiveness).

A control accelerator may be an objective framework that enables a repeatable process for raising a desired control environment to an acceptable risk level. Information from the observation process may be mapped into the control accelerator framework and charted to identify the various areas where controls may be put into place. By quantifying control and risk, spending for controls may be optimized to the risk they represent.

During process mapping, based on the output of the control accelerator, the usable control processes may be used to accelerate risk mediation. Each process may feed a defined step in a control matrix. The control matrix may allow the selection of controls and also show how these controls may potentially affect the immunity rating. Risk-based dashboards may then be used to illustrate the aggregate control environment for defense in depth and measure the effectiveness of deployed controls. Evaluating immunity may include measuring immunity based on a measurable and environmentally sensitive control framework. If the appropriate level of control has not been achieved, then the entire process may be repeated as desired.

Figure 1:
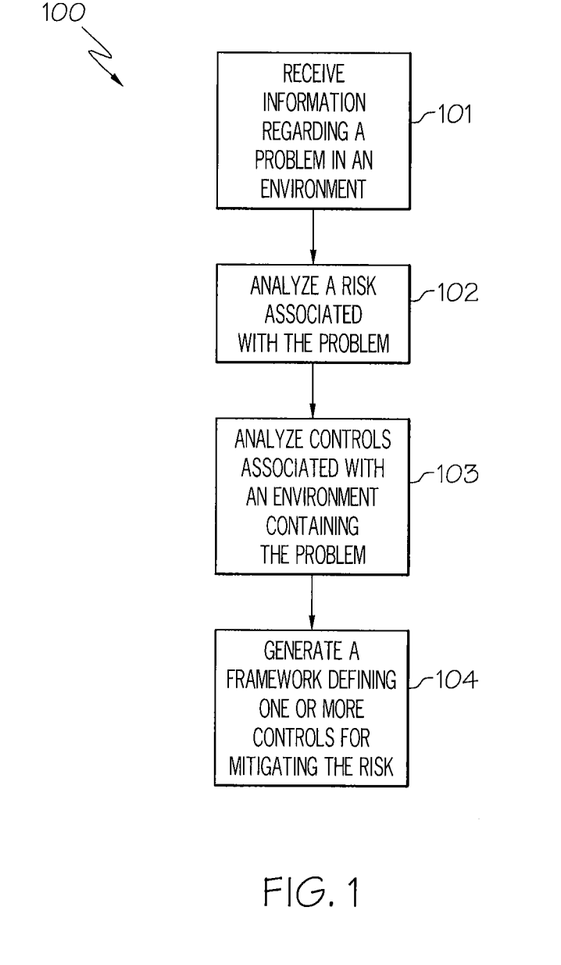
FIG. 1 is a flowchart of a process for control frame generation for improving a security risk of an environment according to an example embodiment of the present invention.

FIG. 1 shows a flowchart of a process for control frame generation for improving a security risk of an environment according to an example embodiment of the present invention. In the process 100, in block 101, information may be received regarding a problem in an environment. In block 102, a risk associated with the problem may be analyzed. In block 103, controls associated with the environment containing the problem may be analyzed. In block 104 a framework may be generated defining one or more controls for mitigating the risk in the environment.

Figure 2:
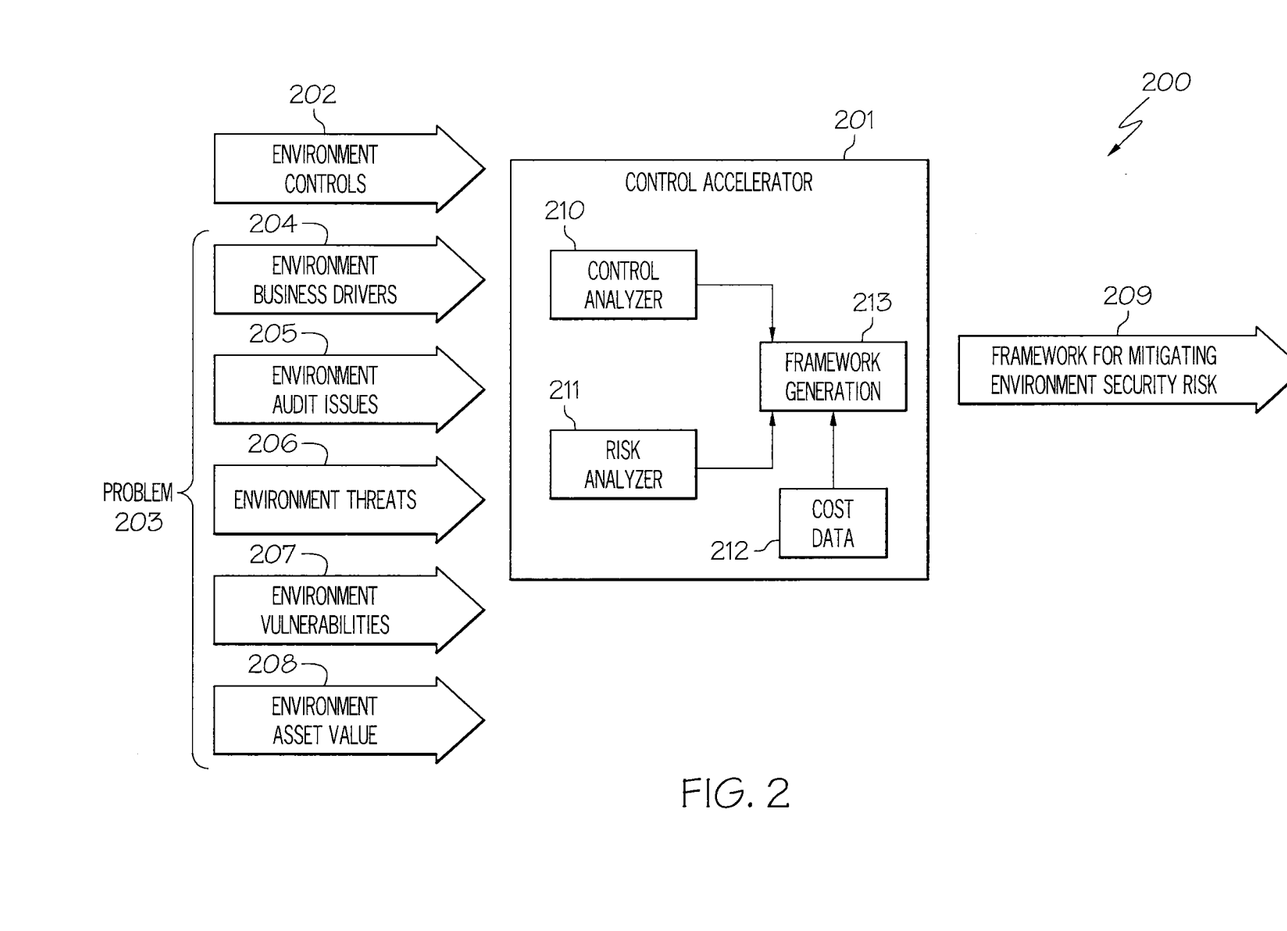
FIG. 2 is a control accelerator for generating a control framework for improving a security risk of an environment according to an example embodiment of the present invention.

FIG. 2 shows a control accelerator for generating a control framework for improving a security risk of an environment according to an example embodiment of the present invention. A control accelerator 201 may receive information related to an environment such as, for example, environment controls 202 and a problem 203 in the environment. The problem 203 may include information related to, for example, environment business drivers 204, environment credit issues 205, environment threats 206, environment vulnerabilities 207, environment asset value 208, etc. The environment controls 202 and the problem information 203 may be fed into the control accelerator 201. The control accelerator 201 may use this information to generate a framework 209 for mitigating an environment security risk. The control accelerator 201 may include a control analyzer 202 and a risk analyzer 211, where each feed information into a framework generation function 213 of the control accelerator 201. The framework generation 213 may also receive cost data 212 that includes a cost for implementing each mitigating control in the environment.

Figure 3:
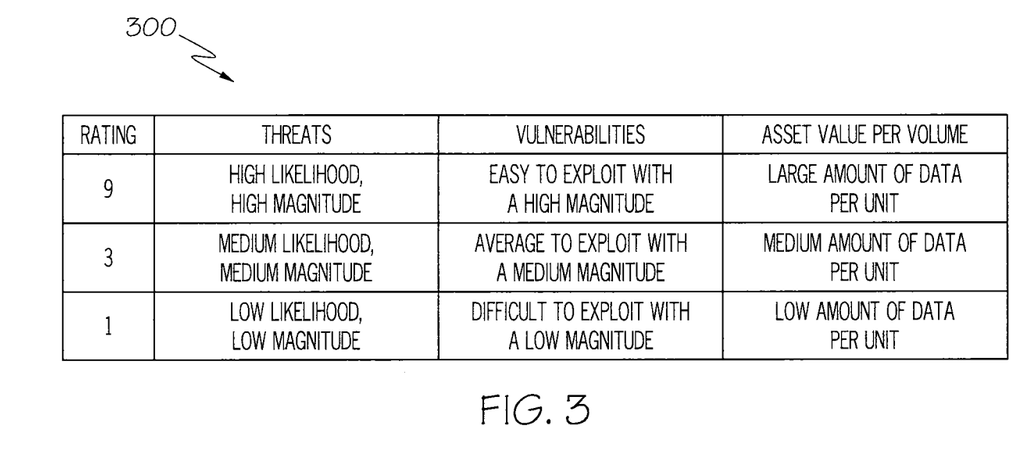
FIG. 3 is a diagram of a table rating threats, vulnerabilities, and asset value per volume according to an example embodiment of the present invention.

FIG. 3 shows a diagram of a table rating threats, vulnerabilities, and asset value per volume according to an example embodiment of the present invention. According to embodiments of the present invention, a risk formula may be created that calculates a residual risk for each unstructured environment. The formula may use information related to threats, vulnerabilities, asset value per volume, and mitigating controls. To illustrate the embodiments of the present invention, these different categories may be ranked on a six sigma scale of, for example, 1, 3, and 9. As shown in the table 300, the threats may have a rating of "9" relating to a high likelihood, high magnitude, a rating of "3" relating to medium likelihood, medium magnitude, or a rating of "1" relating to low likelihood, low magnitude. Further, the vulnerabilities may have a rating of "9" related to easy to exploit with a high magnitude, a rating of "3" relating to average to exploit with a medium magnitude, or a rating of "1" relating to difficult to exploit with a low magnitude. The asset value per volume may have a rating of "9" related to large amount of data per unit, a rating of "3" relating to medium amount of data per unit, or a rating of "1" relating to low amount of data per unit.

Mitigating controls generally relate to controls that are in place currently in each environment. However, mitigating controls may also be added to an environment. To illustrate embodiments of the present invention, the mitigating controls may be ranked anywhere from values 1 through 9. A primary individual risk score may be calculated by multiplying the threat rating by the vulnerabilities rating and by the asset value per volume rating for a specific unstructured data environment. A residual risk for a particular unstructured environment may be calculated by taking the primary individual risk score and dividing this value by the mitigating controls ranking.

Figure 4:
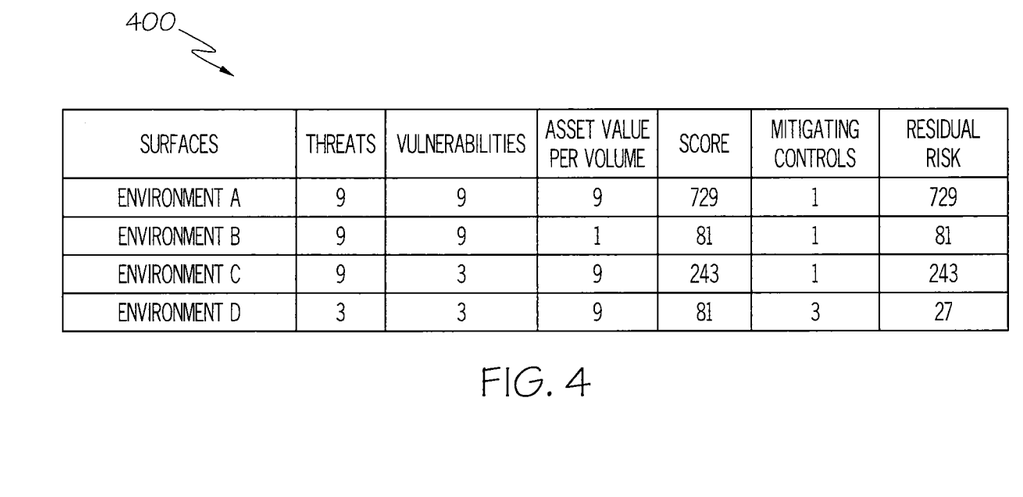
FIG. 4 is a table of information for different environments and associated residual risk according to an example embodiment of the present invention.

FIG. 4 shows a table of information for different environments and associated residual risk according to an example embodiment of the present invention. The table 400 illustrates details related to four different unstructured environments A, B, C, D (Surfaces), and rankings for threats, vulnerabilities, asset value per volume associated with each of these environments. Further, for each environment, a primary individual risk score (Score), mitigating control ranking, and resultant residual risk scores are shown. In this example embodiment, the residual risk ranking may be based on a scoring chart of: "high" from 729 to 243, "medium" from 81 to 27, and "low" from 9 to 1. This ranking may be uniformly used to build conformity to the process of ranking different items based on a scale of high, medium, and low. As shown in the table 400, Environment A has a threat rating of 9, vulnerability rating of 9, and asset value per volume rating of 9, resulting in a primary risk score of 729, and with a mitigating control rating 1 resulting in a residual risk score of 729.

Environment B has a threat rating of 9, vulnerabilities rating of 9, asset value per volume rating of 1 resulting in a primary score of 81, and has a mitigating control rating of 1 resulting in a residual risk score of 81. Further, Environment C has a threat rating of 9, vulnerabilities rating of 3, asset value per volume rating of 9 resulting in a primary score of 243, and has a mitigating control rating of 1 resulting in a residual risk score of 243. Finally, Environment D has a threat rating of 3, vulnerabilities rating of 3, asset value per volume rating of 9 resulting in a primary score of 81, and has a mitigating control rating of 3 resulting in a residual risk score of 27.

Figure 5:
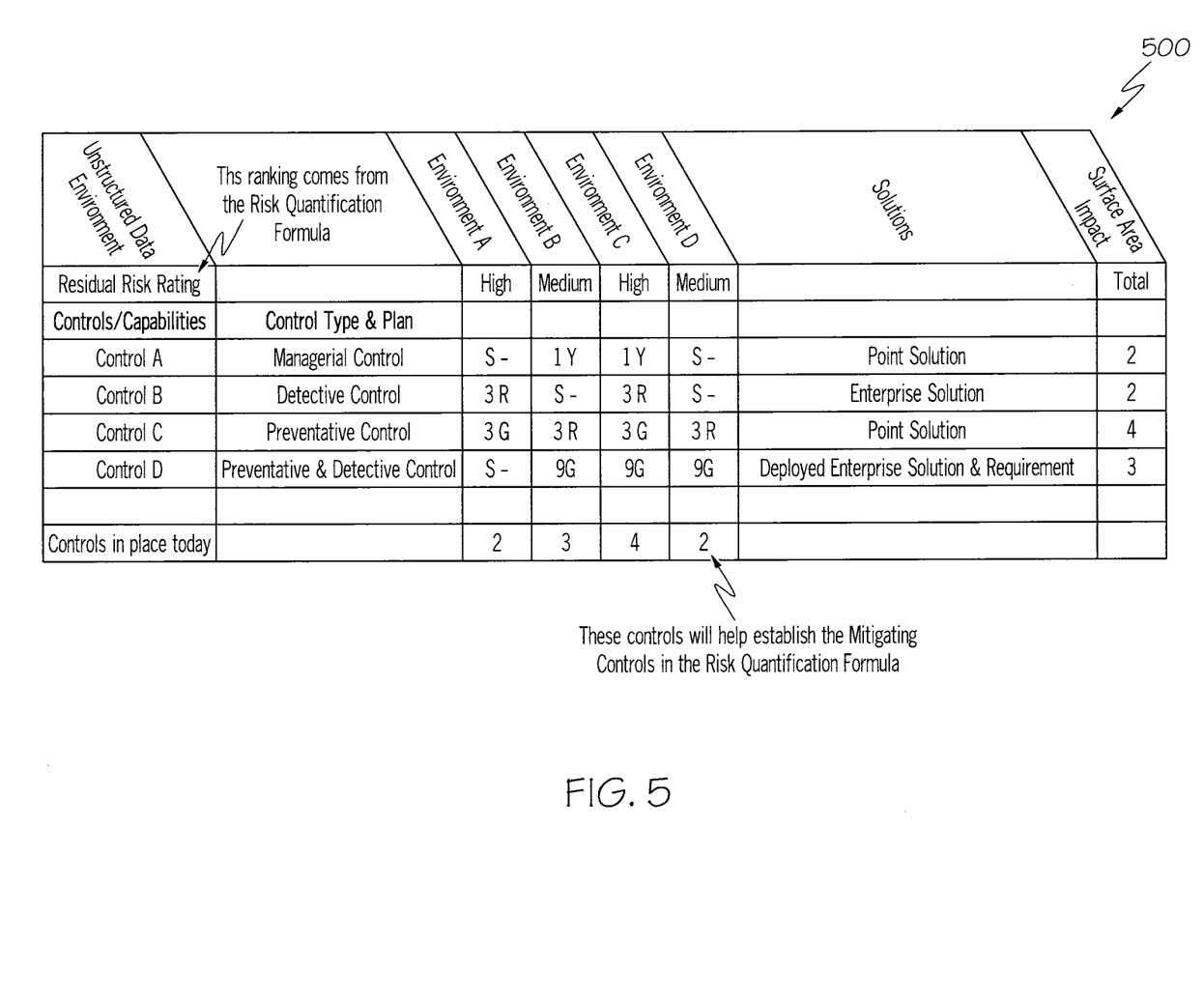
FIG. 5 is a diagram of a control matrix according to an example embodiment of the present invention.

FIG. 5 shows a diagram of a control matrix according to an example embodiment of the present invention. According to embodiments of the present invention, a control matrix may be created that encompasses all the controls that could increase the security and counter measures in the risk formula and help to lower the residual risk. A control matrix 500 may contain a number of controls that allow the different lines of business (or other company groupings) to understand all the different types of controls that may help securely protect each unstructured data environment. These controls, as will be shown following, may help to build a playbook for the line of businesses' unstructured data environment that may incorporate the controls over the course of a period of time. This allows different lines of businesses, or other corporate groups, to know where the controls fit into their tactical and strategic planning.

In the control matrix 500 in row 2 (after the title), the unstructured data environments are listed (i.e., Environment A, Environment B, Environment C, Environment D). In row three, a residual risk rating for each environment is listed based on the risk formula (e.g., low, medium, high). Column 1 lists Controls/Capabilities and lists all controls that are or could be in place in each of the unstructured environments. This provides a view of all the different types of controls in an environment. The second column shows Control Type & Plan and in this example embodiment, lists four distinct control types: Managerial, Detective, Preventive, and Preventive and Detective.

Figure 6:
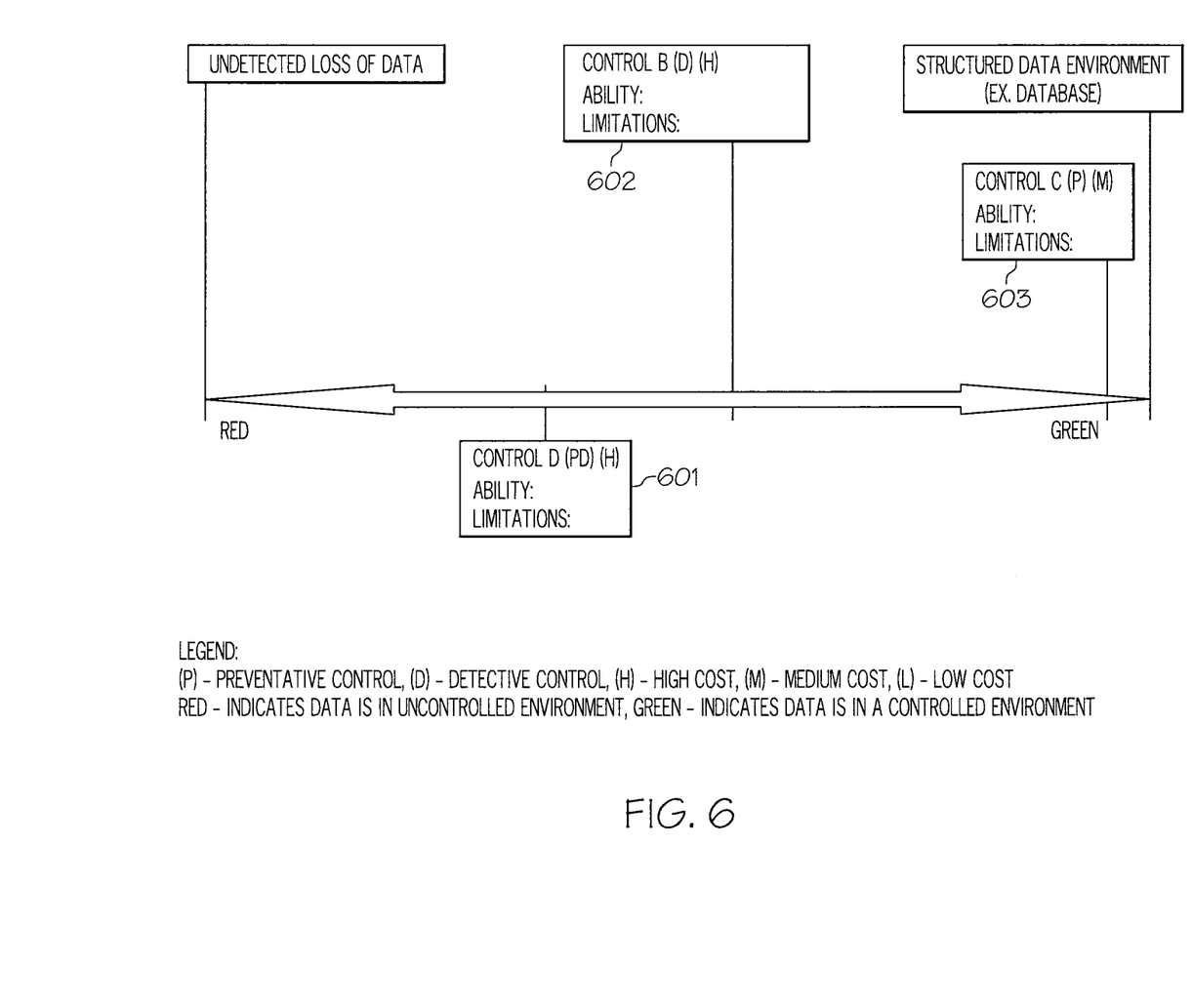
FIG. 6 is a diagram of control meter according to an example embodiment of the present invention.

Also shown in FIG. 6 are three tables 501, 502, 503 that provide further details regarding information in the control matrix 500. For example, table 501 shows further details regarding the managerial control, detective control, preventive control, and preventive and detective control shown under the Control Type & Plan column in the Control Matrix 500. A score, definition, and estimated time frame for implementation of the specific control are shown in table 501. Managerial Controls may be Policy, Vulnerability Management Assessment Recommendations, and Associate Awareness driven.

A control matrix 500 according to embodiments of the present invention may also include a timeframe for implementation into the unstructured data environment. In this example embodiment, these controls are shown as being in place within 3 months. Detective Controls may provide an ability to detect and correct undesirable events which have occurred. In this example embodiment, these controls are shown as being in place within 12 months. Preventative Controls may provide an ability to deter undesirable events from occurring. These controls may take a large amount of time to enforce based on the technology and deployment, which means they may be very strategic tools that may take longer (e.g., longer than 12 months) to deploy. Preventative & Detective Controls may provide an ability to deter the event from occurring and detect at the same time in order to have a record of the event. These controls may take a large amount of time to enforce based on the technology and deployment, which means they may be very strategic tools that take longer (e.g., longer than 12 months) to deploy. The preventive and detective control (PD) has a score of 9, the preventive control (PD) has a score of 3, the detective control (D) has a score of 3, and the managerial control (M) has a score of 1. There may also be a "non-applicable" listed under the controls scoring legend which has no score and may be defined as "the control does not fit the environment."

In this example embodiment, in the control matrix 500, in columns 3-6 and starting at rows 5-8 a heat map may exist that may be designed to show which controls can be in place for each environment. This provides an easy visual view of the environments and controls in place. Colors in the heat map are represented by letter characters, (G) for green, (R) for red, (Y) for yellow, and (S) for silver. These colors are for illustration and to do limit embodiments according to the present invention as any colors may be used and be within the scope of the present invention. Example six sigma numbers (shown in table 501) used to illustrate and score each control may include Preventative & Detective Control (PD) may equal to 9, Preventative Control (P) may equal to 3, Detective Control (D) may equal to 3, Managerial Control (M) may equal to 1, Controls that are not applicable for the environment may be labeled with a "–" sign.

Table 502 shows various colors for the color coding that may be shown in the heat map portion of the control matrix 500. As shown in table 501, in this example embodiment, the color Green (G) may indicate that the Preventative and/or Detective Control is in place for the environment, the color Yellow (Y) may indicate the Managerial Control is in place for the environment, the color Red may indicate the control is not in place for the environment, and the color grey may indicate that the control is not applicable for the environment.

In the control matrix 500, in column G shows Solutions that may be used to relate the type of solution each control represents. Table 503 shows details regarding the environment that the solution may be applied to from the solutions shown in the control matrix 500. For example, a Point Solution may suggest the control can be used within the Line of Business, an Enterprise Solution may suggest the control will need to be placed throughout the entire enterprise, and a Deployed Enterprise Solution & Requirement may suggest the control may be deployed throughout the entire enterprise and this solution is a required standard.

In the control matrix 500, in column H shows Surface Area (i.e., environment) Impact that may show the number of times each control is used in the environment. The controls may be quantified by the impact they have on the total amount of environments. In the control matrix 500, in row 10, Controls in place today, the environments may show the amount of controls in place today. This correlates to the Mitigating Controls in the Risk Quantification.

FIG. 6 shows a diagram of control meter according to an example embodiment of the present invention. The control meter 700 may be used to identify where the controls 601, 602, 603 on the control matrix fit into the spectrum between Unstructured Data that is not protected and a Structured Environment. The control meter 600 may be based on a spectrum of the worst possible scenario being colored in one color (e.g., red) on the far left and labeled as Undetected Loss of Data and the most secure method colored in a second color (e.g., green) on the far right and labeled Structured Data Environment (e.g., a database). Each control 601, 602, 603 from the control matrix 500 may be placed in the control meter spectrum. The location of the controls in the control meter 600 may be based on a number of criteria, for example, the size of the environment, the impact on the environment, the amount of data loss, etc. Each control meter 600 may provide a path for a line of business that they may need to follow in order to securely protect their unstructured data environments and provide the line of business more secure environments. A control meter 600 may be applied to different types of environments according to embodiments of the present invention.

Each control 601, 602, 603 may have associated "abilities" and "limitations" listed along with the control 601, 602, 603 in the control meter 700. This provides a high level overview of each control 601, 602, 603 so each Line of Business can clearly understand how the control 601, 602, 603 may protect the associated environment and the deficiencies of the control 601, 602, 603. The "abilities" and "limitations" for each control 601, 602, 603 may be based on how the control is used in the environment. There may be a control meter for each unstructured data environment.

The "control", "ability" related to the control, and "limitations" related to the control, may be specific to the type of the control as well as the specific environment where the control may be implemented. Each control 601, 602, 603 may be labeled (e.g., here with letters) that correspond back to the control matrix 500. As an example, assuming that the Environment C is a removable media environment where a removable media (e.g., compact disc) may contain sensitive data that has been copied and removed from a personal computer. Control B 602 as shown in the figure may be a detective control (D) having a high (H) residual risk rating, where the control may be, for example, "M point host monitoring (monitoring)" control. The "ability" associated with the control B 602 may be "monitor all data on the computer even when the computer is not on the internal network," and the "limitations" associated with the control B 602 may be "the need for resources to monitor and analyze the reports from the tool."

In another example, Control D 601 shown as a preventive and detective control (PD) with a high (H) residual risk, may represent "N point host monitoring (locking and monitoring)" type control where the "ability" associated with the control D 601 may be "block an monitor all data on the computer even when the computer is not on the internal network," and the "limitations" associated with the control D 601 may be "the high rate of false positives in the blocking capability could cause an impact to the business." Similarly, Control C 603 may represent a particular type of control with associated residual risk rating, ability, and limitations.

A dollar cost for implementing each control in an unstructured data environment may be determined. The cost for a control may be based on many factors, for example, the impact the control may have, the size of the environment, how the control is being used in the environment, etc. As shown in the control meter 600, letters H, M, and L have been used to denote general cost ranges. For example, a High Cost (H) may be based on the fact that it may cost over 2 million dollars to implement the solution in the environment, a Medium Cost (M) may be based on the fact that it may cost between 500,000-1.9 million dollars to implement the solution in the environment, and a Low Cost (L) may be based on the fact that it may cost less than 500,000 dollars to implement the solution in the environment.

Information from the risk formula, a risk quadrant (not shown), control matrix 500, cost for each control, and possibly other information may be fed into the control accelerometer. The control accelerometer may build a Vulnerability Management Control Playbook Scorecard graph ("control playbook") using all of this information where the graph level sets the current environment. Upon review of the control playbook, controls may be removed and/or added from the control matrix 500 and a new control playbook generated to determine how to build tactical and strategic plans for increasing security in a particular environment. Therefore, different controls can be mixed and matched for a particular environment and then a resultant control playbook used to assess their impact on increasing security in a particular environment. As noted previously, the implementation of a specific control in an environment may have an associated dollar cost associated with it. The dollar amount associated with a particular control may be determined from any of many different factors for example, the impact it may have on the environment, the size of the environment, how the control is being used, etc.

Figure 7:
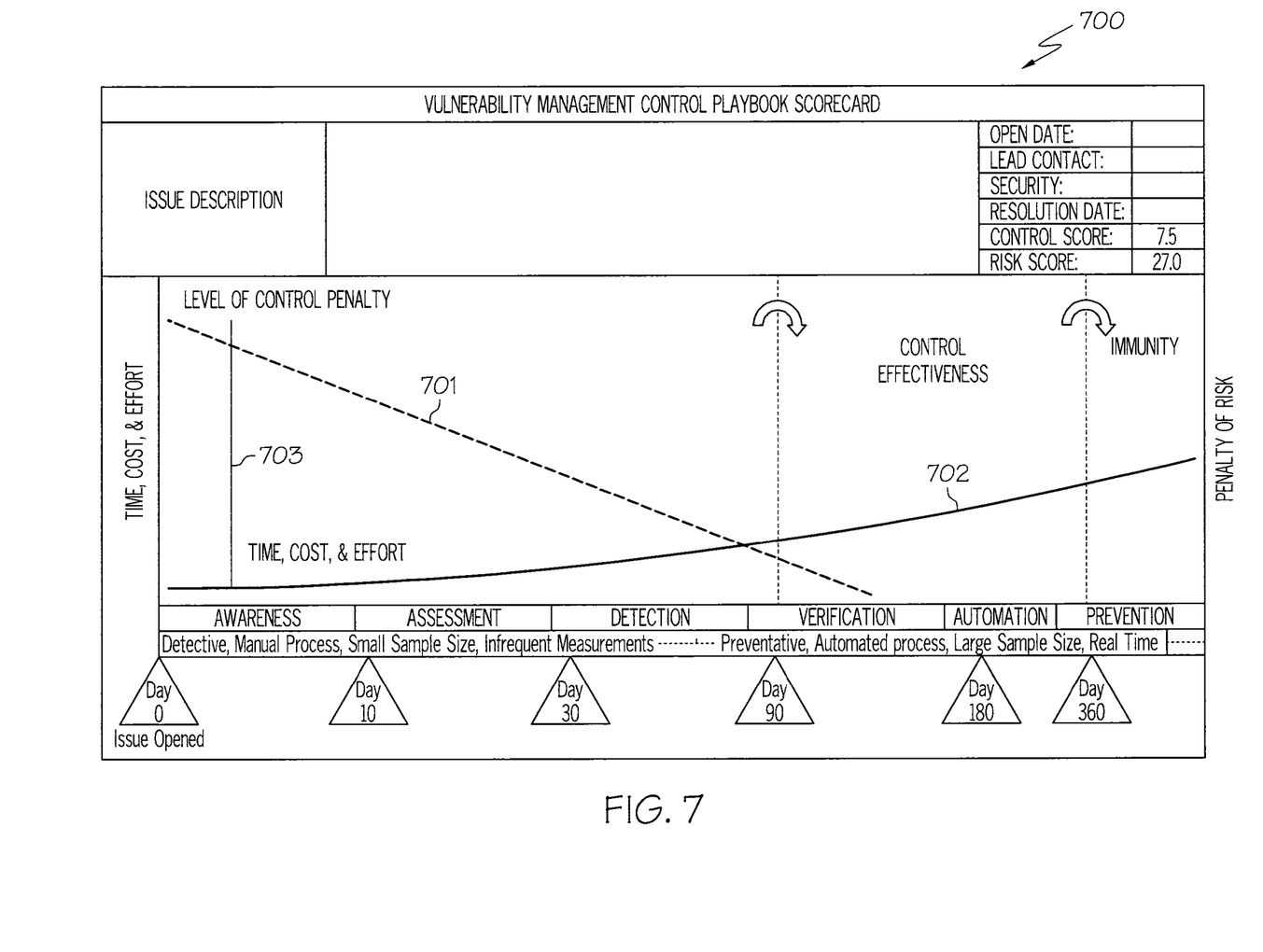
FIG. 7 is a diagram of a Vulnerability Management Control Playbook Scorecard graph according to an example embodiment of the present invention.

FIG. 7 shows a diagram of a Vulnerability Management Control Playbook Scorecard graph according to an example embodiment of the present invention. The control playbook graph 700 represents an output from the control accelerator. The control playbook graph 700 may have a left-most side representing low time, cost and effort and high level of risk, and a right-most side that represents high time, cost and effort and low level of risk. A first curve 701 in the control playbook graph 700 may show a level of risk or penalty and a second curve 702 in the control playbook graph 700 may show a time, cost and effort. The vertical line 703 depicts the level of security for this unsecured data environment based on the mitigating controls as it relates to the first curve 701 and the second curve 702. Since in this example embodiment, the security level line 703 is to the left side of the control playbook graph 700, this may denote a low time, cost and effort and high level of risk, thus a lower level of security in the environment.

To improve the position of the security level line 703 by trying to move it to the right, other mitigating controls may be added and/or existing mitigating controls removed and a new control matrix, new control meter formulation process rerun and a resultant new control playbook graph generated from the control accelerometer. The new control playbook graph may then be reviewed to determine if the additional/modified mitigating controls have moved the security level line 703 further to the right along the horizontal axis of the control playbook graph 700 thus increasing the level of security in the unstructured data environment. Preferably, it may be desired to add, delete or otherwise modify the mitigating controls such that the security level line 703 moves further to the right in the control playbook graph 700 along the horizontal axis closer to the point where the level of risk or penalty curve 701 and the time, cost and effort curve 702 intersect. This point may represent a good balance between decreasing the level of risk or penalty in the environment while controlling increases in time, cost and effort in the environment.

The environment may then be monitored to verify the controls are effectively reducing the residual risk in the associated unstructured data environment. Based on an initial version of the control matrix 500, the control playbook graph 700 may show a progression of changes that occur and how they affect the control matrix 500. The control matrix 500 may reflect the new enhancements, which will increase the mitigating controls on the risk quantification and lower the residual risk of each environment. The control accelerometer may track the increase in controls for each environment and show how the effectiveness of the control is affecting the environment. An assessment team may come back to the line of business over a period of time (e.g., 6-12 months) to determine whether to re-assess the unstructured data environments. At this time new recommendations may be made to the previously assessed unstructured data environments or a new scope may be defined.

Figure 8:
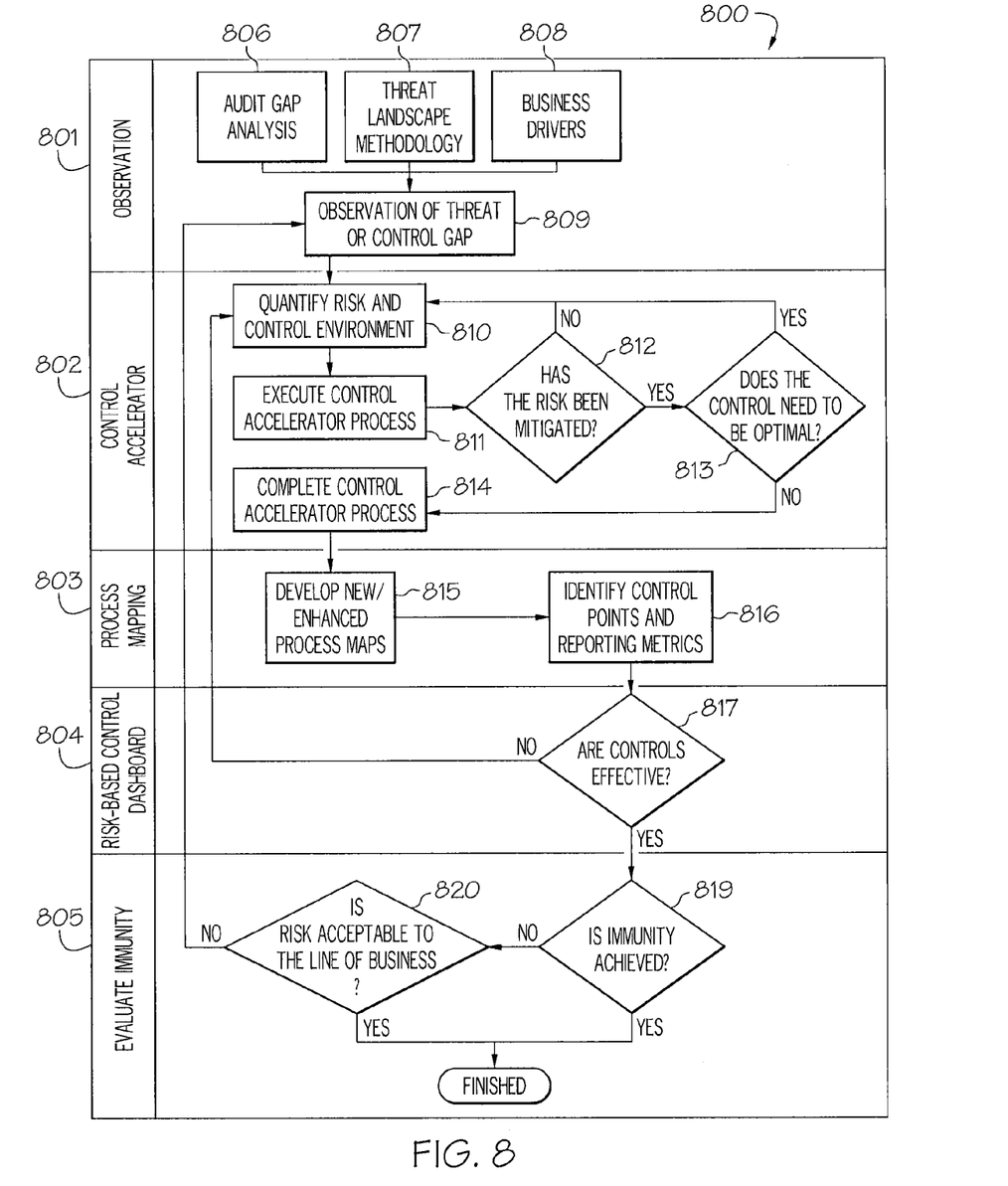
FIG. 8 is a flowchart of an enterprise process for control framework generation for improving a security risk in an environment according to an example embodiment of the present invention.

FIG. 8 shows a flowchart of an enterprise process for control framework generation for improving a security risk in an environment according to an example embodiment of the present invention. The process 800 may include different process portions such as, for example, an observation portion 801, control accelerator portion 802, process mapping portion 803, risk base control dashboard portion 804, and evaluate immunity portion 805, where the output of each portion feeds the input of the following portion. Specifically, the observation portion 801 feeds the control accelerator 802 that feeds the process mapping portion 803 that feeds the risk-based control dashboard portion 804 that feeds the evaluate immunity portion 805.

The observation portion 801 may include in block 806 an audit gap analysis, in block 807 threat landscape methodology, and in block 808 business drivers that each may feed information to block 809 an observation of threat or gap control. The observation of threat or gap control in block 809 may then feed the control accelerator portion 802, specifically in block 810 a quantify risk and control environment function. In block 811, an execute control accelerator process may occur and then in block 812 it may be determined if the risk has been mitigated and if not, the process may return to block 810. If the risk has been mitigated, then in block 813 it may be determined whether the control needs to be optimal and if so, the process returns to block 810. If the control does not need to be optimal, then in block 814 the control accelerator process may be completed and the process proceed to the process mapping portion 803. In the process mapping portion 803, in block 815, new/enhanced process maps may be developed. Then in block 816 control points and reporting metrics may be identified and the process proceed to the risk-based control dashboard portion 804. In the risk-based control dashboard portion 804 in block 817 it may be determined if the controls are effective and if not, the process may return to block 810 in the control accelerator portion 802. If the controls are effective, the process may proceed to the evaluate immunity portion 805 and block 819 where it may be determined if immunity has been achieved and if so, the process ends. If immunity has not been achieved, then in block 820 it may be determined if the risk is acceptable to the line of business and if so, the process ends, whereas if not, the process proceeds to block 809 in the observation portion 801.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for managing risk in a surface area environment comprising:
   receiving, at a computer, information regarding a problem in the surface area environment;
   analyzing, via a computer processor, a security risk associated with the problem, wherein analyzing the security risk includes determining a residual risk score for the surface area environment by multiplying a threat rating by a vulnerabilities rating and by an asset values per volume rating associated with the surface area environment to result in a primary individual risk score and dividing the primary individual risk score by a mitigating controls ranking;
   analyzing, via a computer processor, controls associated with the surface area environment containing the problem; and
   generating, via a computer processor, a framework defining at least one control for mitigating the security risk in the surface area environment responsive to the analyzed security risk and controls, wherein the framework comprises a control playbook graph including (1) a first graph indicating a level of risk in the surface area environment over a predetermined period of time, (2) a second graph indicating time, cost and effort for implementing the at least one control in the surface area environment over the predetermined period of time and (3) a security level line indicating of a level of security in the surface area environment based on the at least one control in relation to the first and second graphs.

2. The method according to claim 1, further comprising generating, via a computer processor, the framework comprising a process map.

3. The method according to claim 1, further comprising generating, via a computer processor, the framework comprising a control dashboard.

4. The method according to claim 1, further comprising receiving, at the computer, the information regarding the problem comprising at least one of control gaps, threats, audit issues, or business drivers.

5. The method according to claim 1, further comprising monitoring the surface area environment to determine if the at least one control for mitigating the security risk is effective.

6. The method according to claim 5, further comprising receiving, at the computer, new information regarding the problem in the surface area environment when the at least one control for mitigating the security risk is not effective.

7. The method according to claim 6, further comprising:
   analyzing, via a computer processor, controls associated with the surface area environment containing the problem based on the at least one control for mitigating the security risk being not effective; and
   generating, via a computer processor, a new framework defining at least one control for mitigating the security risk in the surface area environment responsive to the analyzed security risk and controls.

8. A device for control acceleration, the device comprising:
   a computing platform including a memory and a processor in communication with the memory;
   a first analyzer module stored in the memory, executable by the processor and configured to analyze at least one control in a surface area environment;
   a second analyzer module stored in the memory, executable by the processor and configured to analyze a security risk associated with a problem in the surface area environment and determine a residual risk score for the surface area environment by multiplying a threat rating by a vulnerabilities rating and by an asset values per volume rating associated with the surface area environment to result in a primary individual risk score and dividing the primary individual risk score by a mitigating controls ranking; and
   a framework generation module stored in the memory, executable by the processor and configured to generate a framework defining at least one mitigating control for mitigating the security risk in the surface area environment responsive to the analyzed at least one control and the analyzed security risk, wherein the framework comprises a control playbook graph including (1) a first graph indicating a level of risk in the surface area environment over a predetermined period of time, (2) a second graph indicating time, cost and effort for implementing the at least one control in the surface area environment over the predetermined period of time and (3) a security level line indicating of a level of security in the surface area environment based on the at least one control in relation to the first and second graphs.

9. The device according to claim 8, wherein the first analyzer module is further configured to analyze whether the at least one control is in place in the surface area environment, a type of each control and an associated score, and a type of solution associated with each control.

10. The device according to claim 8, wherein the second analyzer module is further configured to analyze a threat rating for the surface area environment, a vulnerabilities rating for the surface area environment and an asset value per volume rating for the surface area environment.

11. The device according to claim 8, wherein the framework generation module is further configured to generate the framework including abilities and limitations for each mitigating control.

12. The device according to claim 8, wherein the framework generation module is further configured to generate the framework including a cost associated with each mitigating control.

13. The device according to claim 8, wherein the framework generation module is further configured to generate the framework including abilities, limitations, and a cost for each mitigating control, and associated abilities, limitations, and cost being illustrated in a spectrum from undetected loss of data to structured data environment.

14. An apparatus comprising a non-transitory computer-readable medium with instructions stored therein, the instructions when executed causing a processing device to perform:
   receiving information regarding a problem in a surface area environment;
   analyzing a security risk associated with the problem, wherein analyzing the security risk includes determining residual risk score for the surface area environment by multiplying a threat rating by a vulnerabilities rating and by an asset values per volume rating associated with the surface area environment to result in a primary individual risk score and dividing the primary individual risk score by a mitigating controls ranking;
   analyzing controls associated with the surface area environment containing the problem; and generating a framework defining at least one control for mitigating the security risk in the surface area environment responsive to the analyzed security risk and controls, wherein the framework comprises a control playbook graph including (1) a first graph indicating a level of risk in the surface area environment over a predetermined period of time, (2) a second graph indicating time, cost and effort for implementing the at least one control in the surface area environment over the predetermined period of time and (3) a security level line indicating of a level of security in the surface area environment based on the at least one control in relation to the first and second graphs.

15. The apparatus according to claim 14, wherein the instructions when executed cause a processing device to perform generating the framework comprising a process map.

16. The apparatus according to claim 14, wherein the instructions when executed cause a processing device to perform generating the framework comprising a control dashboard.

17. The apparatus according to claim 14, wherein the instructions when executed cause a processing device to perform receiving information regarding the problem comprising at least one of control gaps, threats, audit issues, or business drivers.

18. The apparatus according to claim 14, wherein the instructions when executed cause a processing device to perform receiving new information regarding the problem in the surface area environment when monitoring the surface area environment determines that the at least one control for mitigating the security risk is not effective.

19. The apparatus according to claim 18, wherein the instructions when executed cause a processing device to perform:
  analyzing controls associated with the surface area environment containing the problem on the at least one control for mitigating the security risk being not effective; and
  generating a new framework defining at least one control for mitigating the security risk in the surface area environment responsive to the analyzed security risk and controls.

* * * * *